(12) United States Patent
Gershenson et al.

(10) Patent No.: US 10,093,382 B1
(45) Date of Patent: Oct. 9, 2018

(54) QUICK RELEASE MECHANISM AND BICYCLE USING THE SAME

(71) Applicant: Detroit Bikes LLC, Detroit, MI (US)

(72) Inventors: John Gershenson, Chassell, MI (US); Thomas Tetzloff, Hancock, MI (US); Anthony Reale, Allen Park, MI (US)

(73) Assignee: Detroit Bikes LLC, Detroit, MI (US)

( * ) Notice: Subject to any disclaimer, the term of this patent is extended or adjusted under 35 U.S.C. 154(b) by 0 days.

(21) Appl. No.: 15/484,675

(22) Filed: Apr. 11, 2017

(51) Int. Cl.
*B62K 21/16* (2006.01)
*F16B 7/04* (2006.01)

(52) U.S. Cl.
CPC .............. *B62K 21/16* (2013.01); *F16B 7/042* (2013.01); *B62K 2206/00* (2013.01)

(58) Field of Classification Search
CPC ...... B62K 21/00; B62K 21/12; B62K 21/125; B62K 21/16; B62K 21/18; B62K 21/22; B62K 21/24; B62K 2206/00; F16B 7/042
See application file for complete search history.

(56) References Cited

U.S. PATENT DOCUMENTS

| | | | | |
|---|---|---|---|---|
| 4,354,399 A * | 10/1982 | Katayama | ............ | B62K 21/12 403/104 |
| 4,688,817 A * | 8/1987 | Mader | ................... | B62B 13/10 180/182 |
| 5,323,664 A * | 6/1994 | Fairfield | ............... | B62K 21/16 74/551.1 |
| 5,477,747 A * | 12/1995 | Cheng | ................... | B62K 21/12 280/279 |
| 5,536,102 A * | 7/1996 | Kao | ...................... | B62K 21/12 403/320 |
| 5,727,427 A * | 3/1998 | Nien | ..................... | B62K 21/16 74/551.1 |
| 7,296,813 B2 * | 11/2007 | Montague | ............. | B62K 15/00 280/276 |
| 7,353,731 B2 * | 4/2008 | Lin | ........................ | B62K 21/12 74/551.7 |
| 7,407,176 B2 * | 8/2008 | McJunkin | ............. | B62K 21/12 280/279 |
| 8,915,667 B2 * | 12/2014 | Bingham, Jr. | ......... | A63B 22/00 403/109.5 |
| 8,925,668 B1 * | 1/2015 | Mofield | .................. | B62M 6/60 180/206.1 |
| 9,090,306 B2 * | 7/2015 | Wang | .................. | B62K 15/008 |
| 9,254,886 B2 * | 2/2016 | Chu | ..................... | B62K 21/16 |
| 9,359,036 B2 * | 6/2016 | Thompson | .......... | B62K 15/008 |
| 9,862,450 B2 * | 1/2018 | Meggiolan | ............ | B62K 21/12 |

(Continued)

FOREIGN PATENT DOCUMENTS

| | | | | |
|---|---|---|---|---|
| DE | 202017103316 U1 * | 6/2017 | ............ | B62K 21/16 |
| EP | 0736447 A1 * | 10/1996 | ............ | B62K 21/16 |
| WO | WO-2013131254 A1 * | 9/2013 | ............ | B62K 21/16 |

*Primary Examiner* — Adam D Rogers
(74) *Attorney, Agent, or Firm* — Bill C Panagos; Daniel J. Checkowsky; Panagos Law Group (57) ABSTRACT

A quick release assembly for attaching handlebars to a vehicle is disclosed. The assembly is a cam assembly that in a first position engages the handlebars of a vehicle in an operational position and when said cam assembly is in a second position disengages the handlebars to permit easy storage of the vehicle in a minimum of space. The quick release assembly permits a tool free assembly of a vehicle with a handlebar, such as, for example, a bicycle.

19 Claims, 6 Drawing Sheets

(56) References Cited

U.S. PATENT DOCUMENTS

| | | | | |
|---|---|---|---|---|
| 2006/0099027 | A1* | 5/2006 | Liao | B62K 21/12 |
| | | | | 403/322.4 |
| 2007/0186716 | A1* | 8/2007 | Chen | B62K 21/16 |
| | | | | 74/551.3 |
| 2007/0241531 | A1* | 10/2007 | D'Aluisio | B29C 70/446 |
| | | | | 280/279 |
| 2010/0186544 | A1* | 7/2010 | Tsai | B62K 21/16 |
| | | | | 74/551.3 |
| 2012/0125145 | A1* | 5/2012 | VanderVeen | B62H 5/04 |
| | | | | 74/551.8 |
| 2016/0347398 | A1* | 12/2016 | Wang | B62K 21/16 |
| 2017/0233029 | A1* | 8/2017 | Li | B62K 21/18 |
| | | | | 74/551.1 |

\* cited by examiner

FIG. 6B

QUICK RELEASE MECHANISM AND BICYCLE USING THE SAME

TECHNICAL FIELD

Bicycles are becoming an important a part of new urban planning such that some cities are planning to be complete free of internal combustion engines or even motorized vehicle of any kind. Bicycles are a viable option for such a "green" urban plan. However, bicycles had been difficult to assemble for the consumer because there was a need to assemble the bicycles using various tools. Many times, the consumer requires the assistance of a bicycle technician adding to the cost of the bicycle. Moreover, even when the bicycle is assembled by the consumer, there is no assurance that the handlebars and stem are in the proper position. Shipping and storage are also concerns. When the bicycle is shipped to the consumer, it is usually in a disassembled state, requiring several hours to assemble it from the parts in the shipping container. Bicycles are shipped this way because, once assembled, the bicycles have a large side to side profile because the handlebars are oriented transverse to the wheels of the bicycle.

There is a need for a way to ship and store bicycles such that the bicycle may be assembled without tools by the consumer and further that it may be stored by orienting the handle bars in the same direction as the wheels of the bicycle without the need for tools. This facilitates being able to stow the bicycle in a narrow hall way or office space. In addition, bicycles equipped with a quick release device may be shipped in more compact containers to consumers who are able to easily assemble the bicycle out of the box without the need for tools.

DETAILED DESCRIPTION

Figure 1A:
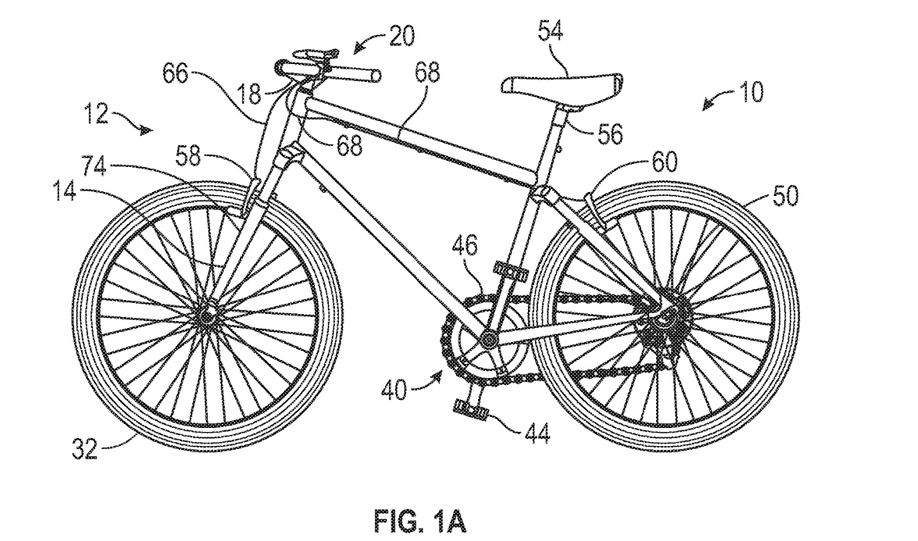
FIG. 1A is a side view of a vehicle including one embodiment of the quick release system.
Figure 1B:
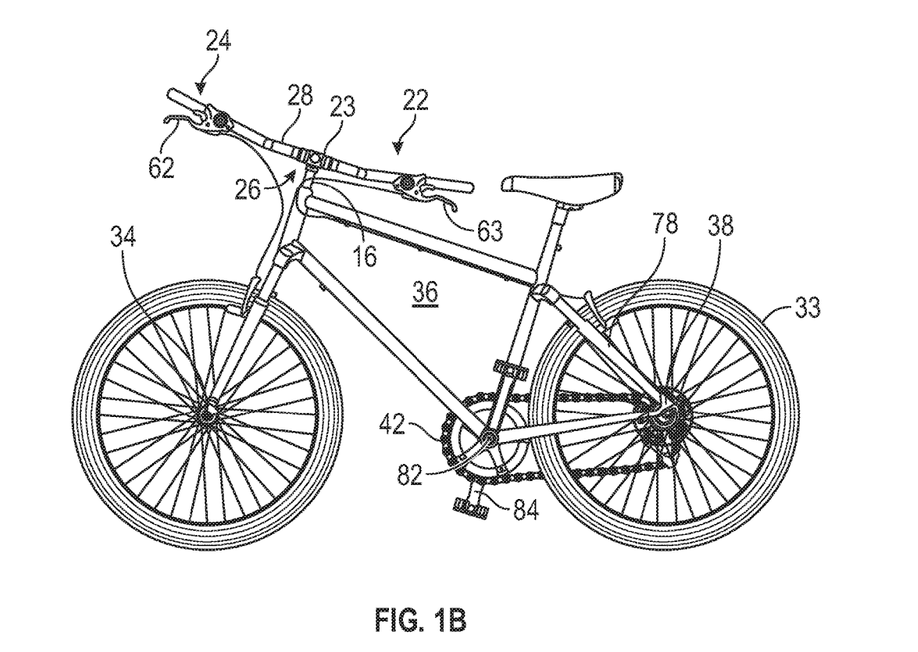
FIG. 1B is a side view of a vehicle including one embodiment of the quick release system showing a storage position.
Figure 1C:
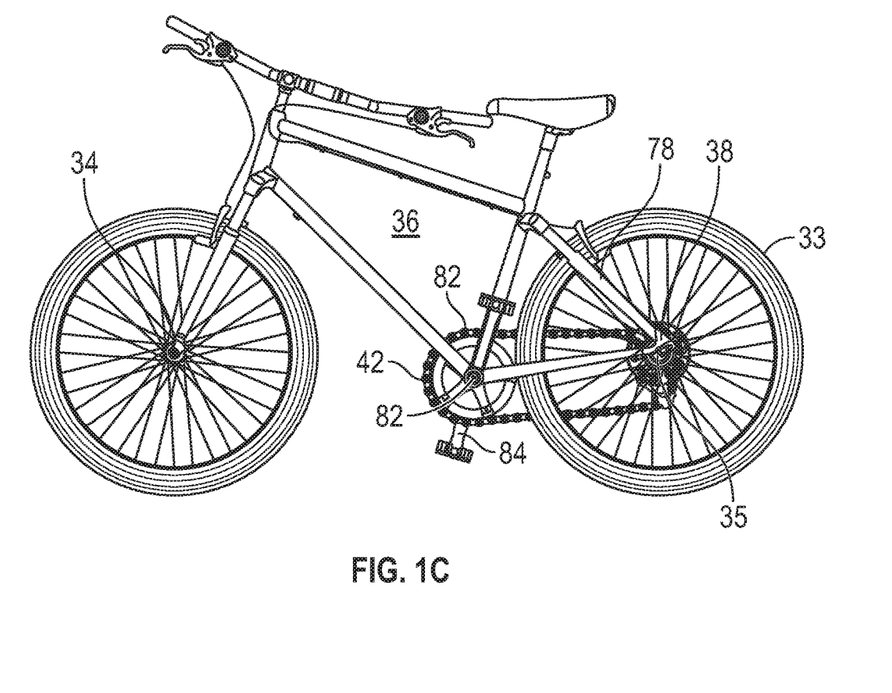
FIG. 1C is a side view of a vehicle with the handlebars in a shipping position.

Turning now to the drawings wherein like numbers refer to like structures, and particularly to FIGS. 1A through 1C, there is shown a vehicle 10, which is depicted as a bicycle. While a bicycle will be described for illustrative purposes, those skilled in the art understand that any vehicle that may use a quick release system as will hereinafter be described is included. For example, the vehicle could be a motorcycle, a moped, a scooter, a riding lawnmower, a golf cart or any other vehicle.

Bicycle 10 has a front portion 12 that includes a fork assembly 14 and steerer tube 16. The steerer tube 16 is included as part of the fork and the stem and headset 13 attach to it. As seen in the figures, the steerer tube attachment 17 (into which the headset fits to permit the handle bar to turn the wheels right and left) includes a stem 18 attached at one end to the steerer tube attachment 17 and terminating in an opposite end with a stem attachment portion 23. The stem attachment portion is used to secure the handlebar 20 to the bicycle steerer tube and with the headset, allow the handlebars to rotate relative to the frame. As is customary, that handlebar has bar ends 22 and 24, respectively, and an intermediate handlebar portion 26 disposed between the bar ends. The intermediate handlebar portion has a handlebar attachment portion 28 that may be of greater diameter than the bar ends, and interacts with the stem attachment portion in a manner to be hereinafter described.

The fork assembly has a fork end which permits a wheel 32 to be attached to the fork assembly at the axle 34 as is well known to those in the art. The bicycle has a frame 36 and at its rear end has rear fork 38 whereby rear wheel 33 is secured thereto by the rear axle 35 as is well understood in the art. The bicycle has a pedal mechanism 40 that includes a cog 42 and pedals 44 attached by the spindle 82 to the crank 84 to drive the chain 46. The frame may have a hanger for attachment of a derailleur 50 to permit the gears to be changed. The bicycle includes a seat or saddle 54 affixed to a seat post 56 adjustably carried in the frame. The bicycle has brakes 58 and 60, activated by transmitting motion of the brake levers 62, 63 through cables 66, 68, respectively to apply braking force to the bicycle. The derailleur has a gear shifter and gear shifting cable to transmit the selected gear from the lever position to the derailleur. Optionally, the bicycle may be equipped with front shock assembly 74, carried by the front fork, and rear shock assembly 78, for riding comfort. When the bicycle is to be stored or packaged for shipment, the stem attachment portion 23 is loosened and no longer tightly engages the handlebar attachment portion 28 or the steerer tube 16. In this condition, the handlebars may be rotated transversely to align with the wheels, and handlebars may be moved toward the rear of the bicycle through the unsecured stem attachment portion 23 thereby making the bicycle more compact front to rear. The bicycle can then be stored in a smaller space or may be shipped in a smaller container.

Figure 2A:
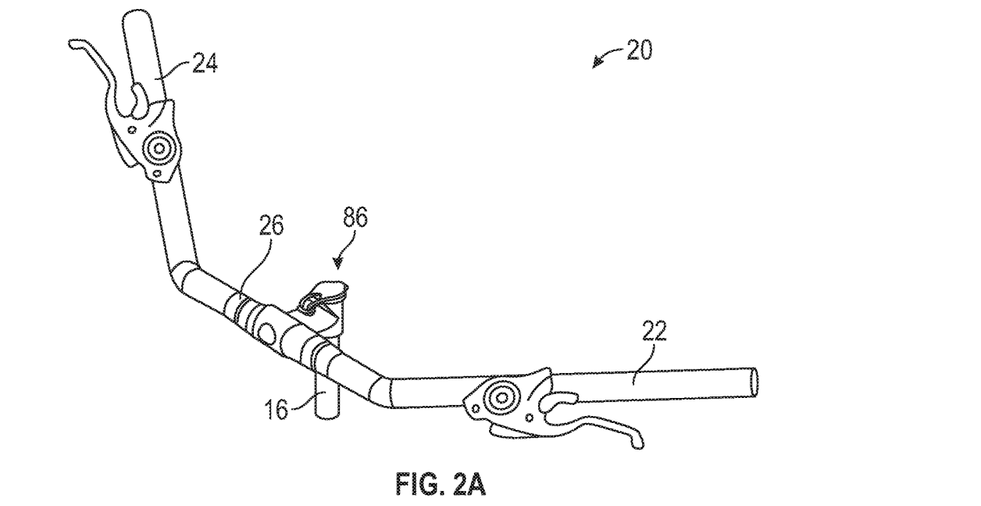
FIG. 2A is a perspective view of a handlebar assembly including one embodiment of the quick release system.
Figure 2B:
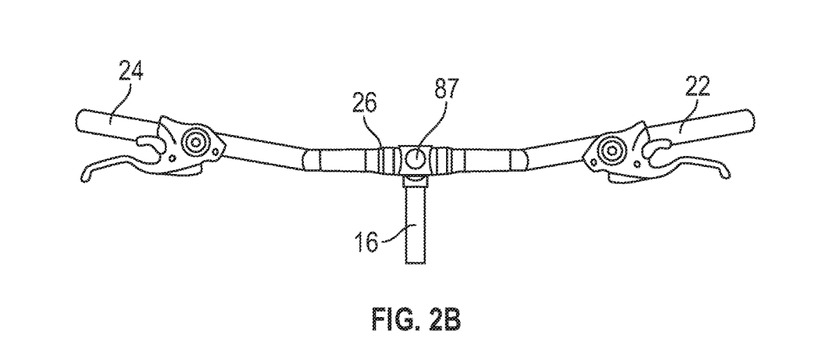
FIG. 2B is a front view of the handlebar assembly of FIG. 2A.
Figure 2C:
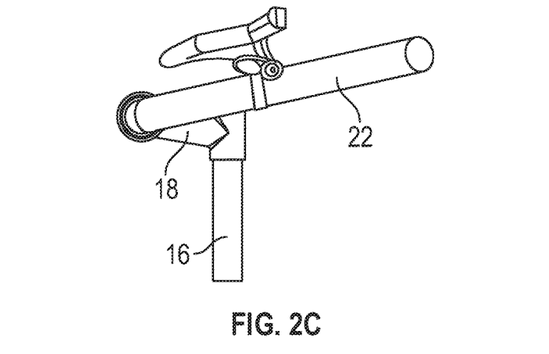
FIG. 2C is a side view of the handlebar assembly of FIG. 2A.
Figure 3A:
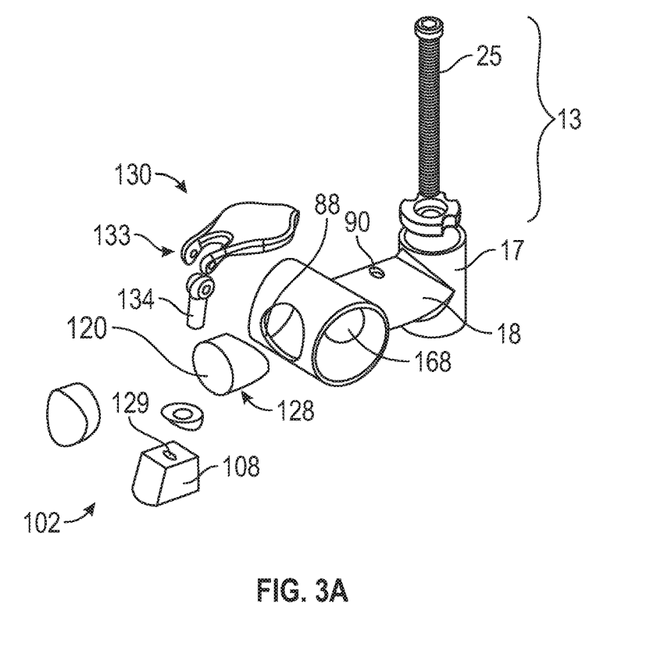
FIG. 3A is a front perspective view of a steerer tube showing one embodiment of the quick release system.
Figure 3B:
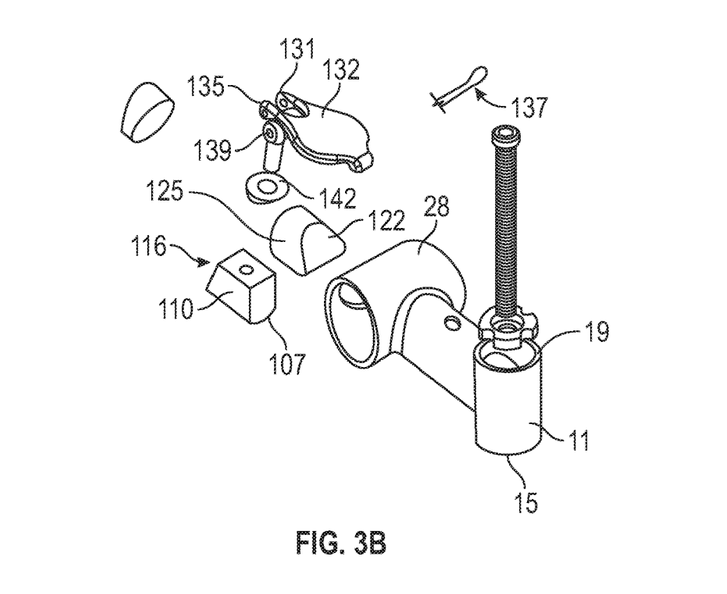
FIG. 3B is a rear perspective view of a steerer tube of FIG. 3A showing one embodiment of the quick release system.
Figure 3C:
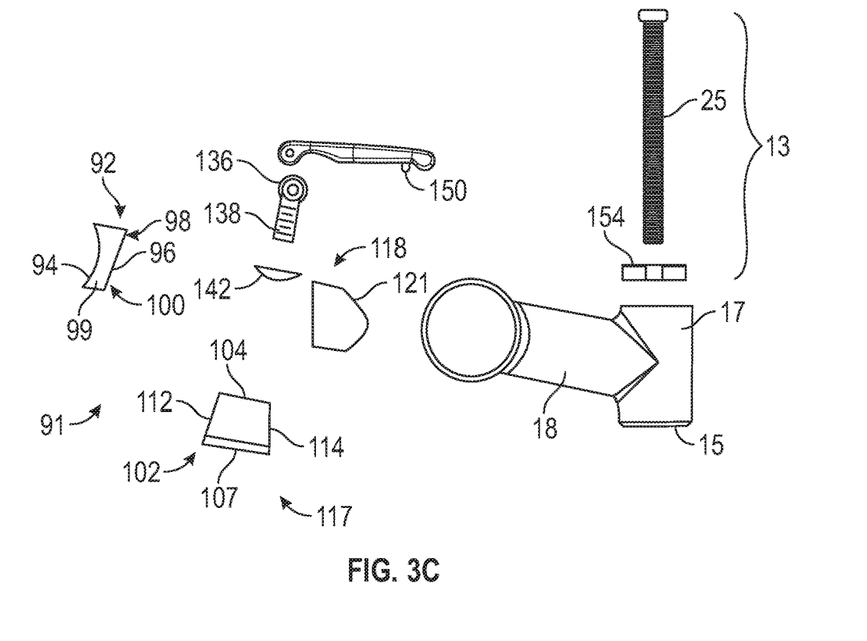
FIG. 3C is a side perspective view of the steerer tube of FIG. 3A showing one embodiment of the quick release system.
Figure 4A:
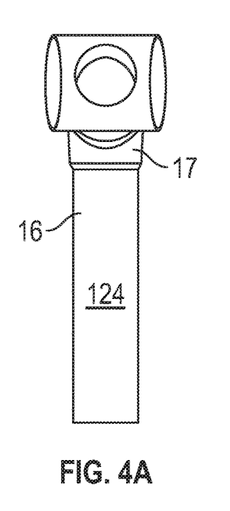
FIG. 4A is a front view of a steerer tube with one embodiment of the quick release system installed.
Figure 4B:
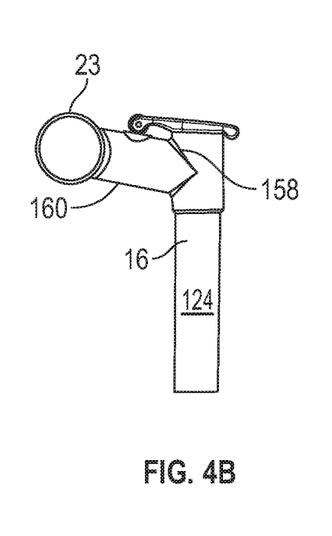
FIG. 4B is a side view of a steerer tube of FIG. 4A with one embodiment of the quick release system installed.
Figure 4C:
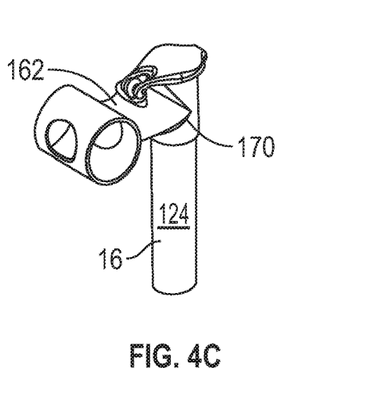
FIG. 4C is a perspective view of the steerer tube of FIG. 4A with one embodiment of the quick release system installed.

Having described a vehicle, such as a bicycle that may include a quick release system, FIGS. 2A through 2C depict handlebar 20 and steerer tube attachment 17 with stem 18 and quick release mechanism 86. The stem attachment portion has an access 87, shown as an aperture, to accommodate assembly in the factory as well as to assist in the correct rotation of the handlebars in the stem in the quick release apparatus as will be hereinafter described. The handle bar has bar ends 22, 24, respectively separated by an intermediate section 26 that may be of larger diameter than the bar ends, and fit into the stem attachment portion.

Turning now to FIGS. 3A through 6B, the quick release mechanism 86 will be described. Steerer tube attachment 17 has a first end 19 and a second end 15 separated by a sidewall 11. The sidewall provides the steerer tube attachment 17 with an inner diameter and an outer diameter extending substantially unbroken therebetween to define an inner space. The steerer tube attachment 17 is open at the first end 19 and the second end 15. As is well known in the art, the headset 13 in inserted through the steerer tube attachment 17 into the steerer tube 16 and a star nut 154 is insertable into the first end of the steerer tube attachment. A fastener, shown as a threaded bolt 25 is inserted through the star nut to engage the headset and secure it to the fork assembly so as to hold the headset in the steerer tube to the fork in the front assembly of the bicycle.

A stem portion 18 is shown as a tube having a first end 158 and a second end 160 separated by a sidewall 162 with an inner diameter 164 and an outer diameter 166 extending substantially unbroken therebetween to define an inner space 168. The first and second ends are open. The first end of the stem is affixed at a location 170 between the first and second ends of the steerer tube attachment 17. The stem 18 has an aperture 90 through at least one side of the stem sidewall. The stem carries the stem attachment portion 23 at its second end 160. While the stem attachment portion is shown as a tube transverse to the stem having an access aperture 88, those skilled in the art recognize that the stem attachment portion could be configured to be a "C" configuration that might require a plate or other device to complete the circumference of the stem attachment portion to engage the handlebar.

A cam assembly 91 has a first cam shoe 92 with a first profile face 94 that engages the surface profile of the handlebar intermediate portion 26 and a second profile face 96 having an angled profile 98 separated by a sidewall 99 extending substantially unbroken therebetween to define a body 100. In the drawing, the body has a circumferential sidewall indicating cam shoe 92 is circumferential. As for all the parts in the cam assembly, it is only important that the cam assembly fits within the access and the inner space of the stem. Indeed, depending upon the configuration of the stem attachment portion, the access need not be an aperture. For example, if the stem attachment holder was a C clamp configuration, no access aperture is needed because the C clamp configuration gives adequate access to the stem without the need for a defined aperture.

Intermediate cam shoe 102 has a top surface 104 and a bottom surface 107 separated by two opposed sidewalls 108 and 110, respectively. One of the top or bottom surface is of a smaller length than the other, and as shown, for purposes of example only, the top surface is shown as being of smaller length than the bottom surface. The intermediate cam shoe as shown has inclined front wall 112 and rear wall 114 extending substantially unbroken from the bottom wall to the top wall to define a body 116 such that the intermediate cam has a rhomboid profile 117 when viewed on the side.

While it is shown that both the front and rear walls are inclined, it is contemplated that only one of the walls is inclined as well.

The rear cam shoe 118 has an angled inclined front face 120. If the intermediate cam shoe has a rhomboid profile, the rear cam shoe front face incline is at an angle opposite to the incline of the inclined second face profile of the first cam member. This means that if the first cam member inclined second face profile is at an acute angle, the incline of the rear cam shoe first face profile is at an obtuse angle. The rear cam shoe has a second profile 121 with a steerer tube engagement profile 122 to engage the outer circumferential surface 124 of the steerer tube. A sidewall 125 extends substantially unbroken between the first profile and the second profile to define a body 128 which may be circumferential. In this embodiment, the top surface 104 of the intermediate cam shoe 102 has an actuating aperture 129 to accept a stem 134 of a quick release lever 130. The stem has a head portion 136 and a threaded portion 138 for insertion into the actuating aperture in the intermediate cam shoe. The head portion has an aperture 139 extending transversely there through. The lever includes a quick release lever portion 119 having a work surface 132 terminating in an attachment portion 133. The attachment portion has apertures 131, 135 to permit attachment to the stem by inserting a pin 137 or other suitable attachment through the apertures in the quick release lever portion and through the apertures in the head portion of the stem. It could just as easily be configured as a film hinge. The quick release lever portion may be equipped with a locator peg 150 to ensure the quick lever is in the correct position when the quick release lever is in a closed position 157. The stem may be passed through a washer 142 before it is inserted into the top surface aperture of the intermediate cam shoe.

Figure 5A:
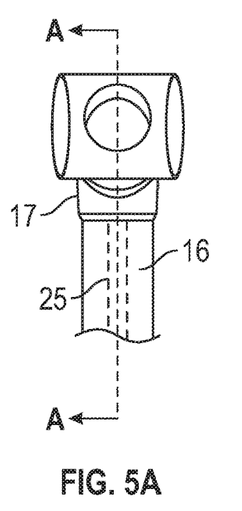
FIG. 5A is a partial view of a steerer tube showing the fastener to a fork assembly.
Figure 5B:
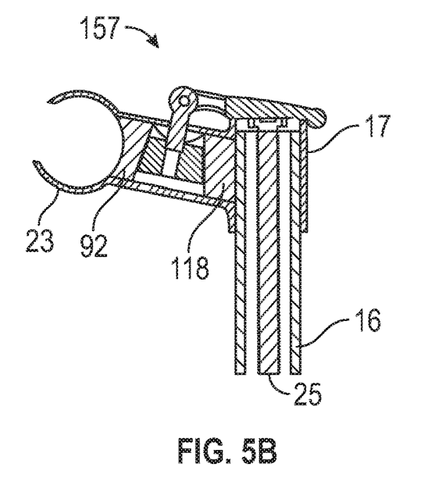
FIG. 5B is a cutaway view of the steerer tube of FIG. 5A taken along line A-A showing the quick release system in a first position.

In operation, the stem goes onto the steerer (after the headset has gone through the steerer), and then the cam assembly is inserted into the access aperture in the stem attachment portion such that the rear cam shoe is inserted first into the access aperture into the inner space of the stem and into engagement with the outer diameter of the steerer tube. The intermediate member is inserted through the access aperture and into the stem inner space. The inclined first face profile of the rear member is in cooperative engagement with the inclined second face profile of the intermediate member. The stem is inserted through the stem aperture and a washer positioned on the top face of the intermediate cam shoe. The stem is threaded into the aperture in the top surface of the intermediate cam. The front cam shoe is also inserted into the inner space of the stem, so that the inclined second face profile is in cooperative engagement with the inclined first face profile of the intermediate member. When the cam assembly is thus placed into position, the lever is in a first open position 149 such, as, for example the position in 6A and 6B. In this position, the intermediate cam portion is in a first position 153 such that the interaction between the first and second inclined face profile surfaces of the intermediate cam shoe does not exert an outward force on the first inclined face profile of the front cam shoe and second inclined face profile of the rear cam shoe. In this position, there is no compressive engagement of the steerer tube 16 by the rear cam shoe and no compressive engagement by the first face profile of the front cam shoe on the intermediate handle bar portion. When the lever is moved into the second closed position 157 as seen in FIGS. 5A and 5B, the intermediate cam is moved within the stem inner space and into compressive engagement with the inclined second and first profiles of the front and rear cam shoes, thereby causing the rear cam to exert a compressive force on the steerer tube 16 and causing the front cam shoe to expert a compressive force against the intermediate portion of the handle bars, thereby securing the handle bar in place. When the locator peg 150 is in mating engagement with the recess 151 in the star nut, the torsion lever is in the proper closed position 157 to secure the handlebars in place.

Figure 6A:
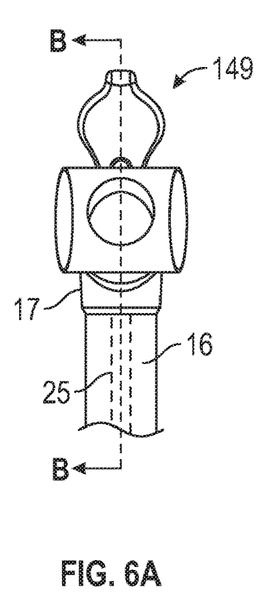
FIG. 6A is a partial view of a steerer tube showing the fastener to a fork assembly with the quick release system in a second position.
Figure 6B:
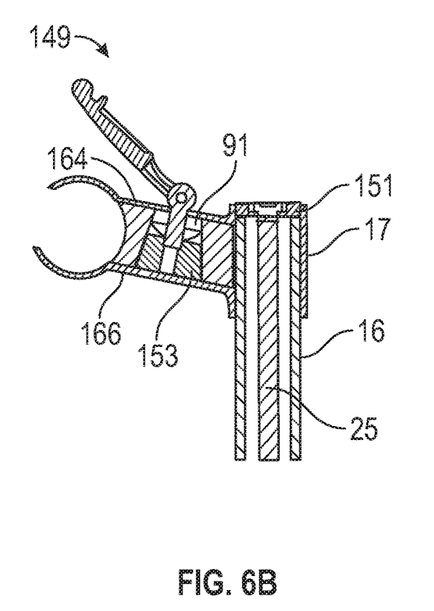
FIG. 6B is a cutaway view of the steerer tube of FIG. 6A taken along line B-B showing the quick release system in a second position.

The cam shoe assembly as described makes bicycle assembly easy and tool-less for a consumer. It is common for a bicycle to be shipped in a box to the consumer such that the wheels are attached to the frame at the front and rear forks, but that the handle bars are disassembled and placed sideways in the shipping box. Using the quick release system as described, the consumer may place the cam assembly into the stem as previously described, position the handlebars into the stem attachment portion such that the intermediate portion of the handlebar is in the stem attachment portion, move the lever from its first position 149 (as seen in FIGS. 6A and 6B) to its second position 157 (as seen in FIGS. 5A and 5B), and completely assemble the bicycle without the need for tools. When it is desired to store the bike, the consumer may move the lever from its closed position 157 as seen in FIGS. 5A and 5B to [a] an open position 149 like that seen in FIGS. 6A and 6B, release the compressive forces against the steerer tube 16 and the handlebar, move the steerer tube attachment 17 relative to the fork assembly so the handlebar orientation is aligned with the bicycle wheels, and thereby store the bicycle in a relatively small space.

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

What is claimed as new and desired to be protected by Letters Patent of the United States is:

1. A vehicle with a handlebar attachment device, comprising:
    a steerer tube attachment having a first end and a second end separated by a sidewall having an inner surface and an outer surface extending therebetween, to define a body with an inner space;
    a stem tube having a first end and a second end separated by a sidewall having an outer surface and an inner surface extending therebetween to define a body having an inner space; said stem tube affixed at one end to a body of a steerer tube at a location between a first end of the steerer tube and a second end of the steerer tube; said stem tube further equipped with a body aperture extending through said stem tube sidewall into said inner space of said stem tube between said first end of said stem tube and said second end of stem tube;
    a stem attachment having a first end and a second end separated by a sidewall having an inner diameter and an outer diameter extending therebetween to define an inner space; said stem attachment further equipped with an access aperture intermediate said stem attachment first end and second end; said access aperture transverse to said stem attachment first and second end and aligned with said stem tube inner space;
    a cam assembly insertable through said stem attachment access aperture into said stem tube inner space; said cam assembly equipped with a torsion lever having a stem insertable through said stem tube body aperture; said cam assembly engaged with the steerer tube when said torsion lever is in a first position to prevent rotation of the steerer tube attachment relative to the steerer tube, and said cam assembly disengaged from said steerer tube when said torsion lever is in a second position to permit rotation of the steerer tube attachment relative to the steerer tube.

2. The vehicle of claim 1, wherein said vehicle is a bicycle.

3. The vehicle of claim 1, wherein said vehicle is motorized.

4. The vehicle of claim 3, wherein said vehicle is a motor cycle, motorbike, scooter moped, lawnmower or gulf cart.

5. A cam assembly, comprising:
    a front cam shoe; said front cam shoe having a first face profile that engages with a handlebar cross-section profile and a second face profile inclined in one direction at an angle relative to said first face profile; said first and second face profiles separated by a sidewall extending therebetween to define a body portion;
    a rear cam shoe; said rear cam shoe having a first face profile inclined in one direction at an angle relative to the second face profile of the first cam shoe; said angle of said first face profile of said rear cam shoe is inclined opposite to the angle of said second face profile of said front cam shoe such that when the second face profile of the front cam shoe is inclined at an obtuse angle, the first face profile of the rear cam shoe is inclined at an acute angle and when the second profile face of the front cam shoe is inclined at an acute angle, the first face profile of the rear cam shoe is inclined at an obtuse angle; said rear cam shoe further having a second face profile to engage a steerer tube; and
    an intermediate cam shoe interposed between said front and rear cam shoes; said intermediate cam shoe having a top surface and a bottom surface separated by opposed sidewalls extending therebetween to define a body; one of said top surface or bottom surface has a smaller length than the other of the top surface or the bottom surface; said intermediate cam shoe further equipped with inclined front and rear walls extending from said top surface to said bottom surface to define a rhomboid profile; at least one of said top and bottom surface equipped with an intermediate cam shoe aperture to accept a cam assembly actuator.

6. The cam assembly of claim 5, wherein said cam assembly actuator is a torsion lever with a stem insertable in said intermediate cam shoe aperture to move the intermediate cam within a stem tube so that an intermediate cam shoe first face profile engages said front cam shoe second face profile and an intermediate cam shoe second face profile engages said rear cam shoe second face profile.

7. The cam assembly of claim 6, wherein said torsion lever includes a locator peg to ensure the torsion lever is in a closed position.

8. The cam assembly of claim 6, further including a washer interposed between said torsion lever stem and said intermediate cam shoe aperture.

9. A handlebar attachment device, comprising:
    a steerer tube attachment having a first end and a second end separated by a sidewall having an inner surface and an outer surface extending therebetween, to define a body with an inner space;
    a stem tube having a first end and a second end separated by a sidewall having an outer surface and an inner surface extending therebetween to define a body having an inner space; said stem tube affixed at one end to said steerer tube attachment body at a location between said steerer tube attachment first and second end; said stem tube further equipped with a body aperture extending through said sidewall of said stem tube into said inner space of said stem tube between said first end and second end of said stem tube;

a stem attachment having a first end and a second end separated by a sidewall having an inner diameter and an outer diameter extending therebetween to define an inner space; said stem attachment further equipped with an access aperture intermediate said stem attachment first end and second end; said access aperture transverse to said stem attachment first and second end and aligned with said stem tube inner space;

a cam assembly insertable through said stem attachment access aperture into said stem tube inner space; said cam assembly equipped with a torsion lever having a stem insertable through said stem tube body aperture; said cam assembly engaged with a steerer tube when said torsion lever is in a first position and said cam assembly disengaged from said steerer tube when said torsion lever is in a second position; said cam assembly including a front cam shoe; said front cam shoe having a first face profile engageable with a handlebar cross-section profile and a second face profile inclined in one direction at an angle relative to said first face profile; said first and second face profiles separated by a sidewall extending therebetween to define a body portion;

a rear cam shoe; said rear cam shoe having a first face profile inclined in one direction at an angle relative to the second face profile of the first cam shoe; said angle of said first face profile said rear cam shoe is inclined opposite to the angle of said second face profile of said front cam shoe such that when the second face profile of the front cam shoe is inclined at an obtuse angle, the first face profile of the rear cam shoe is inclined at an acute angle and when the second profile face of the front cam shoe is inclined at an acute angle, the first face profile of the rear cam shoe is inclined at an obtuse angle; said rear cam shoe further having a second face profile to engage the steerer tube; and an intermediate cam shoe interposed between said front and rear cam shoes; said intermediate cam shoe having a top surface and a bottom surface separated by opposed sidewalls extending therebetween to define a body; one of said top surface or bottom surface has a smaller length than the other of the top surface or the bottom surface; said intermediate cam shoe further equipped with inclined front and rear walls extending from said top surface to said bottom surface to define a rhomboid profile for said intermediate cam shoe; at least one of said top and bottom surface equipped with an intermediate cam aperture accessible from said body aperture of said stem tube to accept said torsion lever.

10. The handlebar attachment device of claim 9, wherein said top surface of said intermediate cam shoe is of smaller length than said bottom surface of said intermediate cam shoe.

11. The handlebar attachment device of claim 9, wherein said top surface is equipped with the intermediate cam aperture to accept said torsion lever stem.

12. The handlebar attachment device of claim 9, wherein said torsion lever includes a locator peg to ensure the torsion lever is in a closed position.

13. The handlebar attachment device of claim 9, further including a washer intermediate said cam assembly and said torsion lever stem.

14. A method to store a vehicle, comprising:

actuating a quick release system from a closed position to an open position to release compressive forces against a steerer tube; said steerer tube supporting a handlebar attachment assembly with a handlebar oriented in a first position relative to a fork assembly; said quick release system further including a steerer tube attachment having a first end and a second end separated by a sidewall having an inner surface and an outer surface extending therebetween, to defining a body with an inner space;

a stem tube having a first end and a second end separated by a sidewall having an outer surface and an inner surface extending therebetween to define a body having an inner space; said stem tube affixed at one end to said steerer tube attachment body at a location between said steerer tube attachment first and second end; said stem tube further equipped with a body aperture extending through said sidewall of said stem tube into said inner space of said stem tube between said first end and said second end of said stem tube;

a stem attachment having a first end and a second end separated by a sidewall having an inner diameter and an outer diameter extending therebetween to define an inner space; said stem attachment further equipped with an access aperture intermediate said stem attachment first end and second end; said access aperture transverse to said stem attachment first and second end and aligned with said stem tube inner space;

a cam assembly insertable through said stem attachment access aperture into said stem tube inner space; said cam assembly equipped with a torsion lever having a stem insertable through said stem tube body aperture; said cam assembly engaged with said steerer tube when said torsion lever is in a first position and said cam assembly disengaged from said steerer tube when said torsion lever is in a second position; and moving said handlebar attachment assembly to a second position so that said handlebar is aligned with a wheel in said fork assembly.

15. The method of claim 14, wherein said quick release system cam assembly further includes:

a front cam shoe; said front cam shoe having a first face profile engageable with a handlebar cross-section profile and a second face profile inclined in one direction at an angle relative to said first face profile; said first and second face profiles separated by a sidewall extending therebetween to define a body portion;

a rear cam shoe; said rear cam shoe having a first face profile inclined in one direction at an angle relative to the second face profile of the first cam shoe; said angle of said first face profile of said rear cam shoe is inclined opposite to the angle of said second face profile of said front cam shoe such that when the second face profile of the front cam shoe is inclined at an obtuse angle, the first face profile of the rear cam shoe is inclined at an acute angle and when the second profile face of the front cam shoe is inclined at an acute angle, the first face profile of the rear cam shoe is inclined at an obtuse angle; said rear cam shoe further having a second face profile to engage the steerer tube; and an intermediate cam shoe interposed between said front and rear cam shoes; said intermediate cam shoe having a top surface and a bottom surface separated by opposed sidewalls extending therebetween to define a body; one of said top surface or bottom surface has a smaller length than the other of the top surface or the bottom surface; said intermediate cam shoe further equipped with inclined front and rear walls extending from said top surface to said bottom surface to define a rhomboid profile for said intermediate cam shoe; at least one of said top and bottom surface equipped with an aperture accessible from said body aperture of said stem tube to accept said torsion lever.

16. The method of claim 15, wherein said intermediate cam shoe top surface is of smaller length than said bottom surface of said intermediate cam shoe.

17. The method of 15, wherein said torsion lever includes a locator peg to ensure the torsion lever is in a locked position.

18. The method of 15, further including a washer intermediate said cam assembly and said stem of said torsion lever.

19. The method of claim 15, wherein said torsion lever is moved from the first position to engage said cam shoes with each other in said cam assembly to the second position to disengage said cam shoes in said cam assembly.

\* \* \* \* \*